United States Patent [19]

Kusumi

[11] Patent Number: 4,633,384
[45] Date of Patent: Dec. 30, 1986

[54] SEQUENCE ABNORMALITY CHECK SYSTEM IN PROGRAMMABLE CONTROLLER

[75] Inventor: Katsuaki Kusumi, Hachiouji, Japan

[73] Assignee: Fanuc Ltd., Minamitsuru, Japan

[21] Appl. No.: 695,362

[22] PCT Filed: May 4, 1984

[86] PCT No.: PCT/JP84/00227
 § 371 Date: Jan. 8, 1985
 § 102(e) Date: Jan. 8, 1985

[87] PCT Pub. No.: WO84/04610
 PCT Pub. Date: Nov. 22, 1984

[30] Foreign Application Priority Data

May 9, 1983 [JP] Japan .................................. 58/79354

[51] Int. Cl.[4] ...................... G06F 15/46; G06F 11/00
[52] U.S. Cl. .................................. 364/184; 364/140; 364/147; 364/900
[58] Field of Search ............... 364/140, 141, 146, 147, 364/184, 186, 900 MS File; 371/16, 20, 29, 60

[56] References Cited

U.S. PATENT DOCUMENTS

| | | | |
|---|---|---|---|
| 3,997,879 | 12/1976 | Markley et al. | 364/141 X |
| 4,062,061 | 12/1977 | Batchelor et al. | 364/900 |
| 4,063,311 | 12/1977 | Jeremiah et al. | 364/900 |
| 4,535,456 | 8/1985 | Bauer et al. | 364/141 X |

*Primary Examiner*—Joseph Ruggiero
*Attorney, Agent, or Firm*—Staas & Halsey

[57] ABSTRACT

An address associated with a failure in a programmable controller is provided, for reading out an operating state of each element of a sequence circuit. The address and a logic level thereof are stored in an address setting table (TA). The logic level is compared with a logic level of an actual signal stored in a signal update storage table (TB), and a difference therebetween is detected by a signal update detecting means (2). Every time a difference is detected, a signal update writing means (3) writes the address and the logic level of the actual signal into the signal update storage table (TB). The storage contents of the signal update storage table (TB) are displayed on a display means, thereby allowing an operator to check for the cause of the failure.

3 Claims, 9 Drawing Figures

FIG. 2
| INSTRUCT-ION CODE | OPERAND | | |
|---|---|---|---|
| ⋮ | ⋮ | | |
| RD | 66.1 | MF | |
| AND·NOT | 67.8 | M28 | |
| AND·NOT | 67.7 | M24 | |
| AND·NOT | 67.6 | M22 | |
| AND·NOT | 67.5 | M21 | |
| AND·NOT | 67.4 | M18 | D1 |
| AND·NOT | 67.3 | M14 | |
| AND | 67.2 | M12 | |
| AND | 67.1 | M11 | |
| WRT | 10.2 | MO3X | |
| ⋮ | ⋮ | | |
| RD | 10.1 | AUT | |
| AND | 10.2 | MO3X | D2 |
| AND·NOT | 10.3 | SPCCW | |
| WRT | 20.5 | SPCW | |
| ⋮ | ⋮ | | |
| RD | 11.1 | HS.M | |
| OR | 11.2 | J.M | |
| OR | 11.3 | MAN | |
| AND | 20.1 | READY | |
| AND·NOT | 20.2 | CRW | |
| WRT | 42.2 | CRA | |
| ⋮ | ⋮ | | |
FIG. 3A
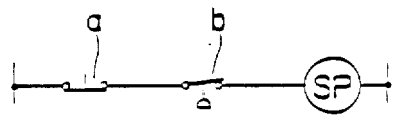
FIG. 3B
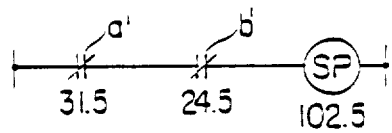

| | SIGNAL ADDRESS | LOGIC LEVEL |
|---|---|---|
| 1 | 31.5 | 0 |
| 2 | 24.5 | 0 |
| 3 | 102.5 | 1 |
| 4 | | |

| | UPDATED SIGNAL ADDRESS | LOGIC LEVEL | LAST UPDATED |
|---|---|---|---|
| 1 | 31.5 | 1 | |
| 2 | 102.5 | 0 | |
| 3 | 31.5 | 0 | |
| 4 | 102.5 | 1 | (C) |
| 5 | 24.5 | 1 | |
| 6 | 102.5 | 0 | |
| 7 | 24.5 | 0 | |
| 8 | 102.5 | 1 | 0 |
| 9 | | | |
| 10 | | | |
| 11 | | | |
| ... | | | |
| n | | | |

4,633,384

1

SEQUENCE ABNORMALITY CHECK SYSTEM IN PROGRAMMABLE CONTROLLER

BACKGROUND OF THE INVENTION

The present invention relates to a sequence abnormality check system in a programmable controller so as to check a cause of failure when abnormality occurs in processing results of the programmable controller.

In a conventional sequence control system, a sequence circuit is arranged between a control device and a machine to be controlled. The sequence circuit comprises a heavy current circuit consisting of a number of relays. A predetermined relay is operated in response to an instruction from the control device so as to cause machine members to perform a predetermined operation in accordance with this instruction. In a system using a programmable controller (to be referred to as a PC hereinafter), information for the sequence circuit is stored in the form of a program in a memory of the PC, thereby performing sequence control.

For example, the sequence circuit is exemplified by a ladder diagram represented by relay symbols, as shown in FIG. 1. A sequence program having a logical sequence of instruction codes and operands shown in FIG. 2 is stored in a memory of the PC, thereby achieving proper sequence control.

The ladder diagram shown in FIG. 1 comprises part of a ladder diagram of a numerical control (NC) machine tool system. Symbols ⊣⊢ and ⊣⊬ denote normally open and closed contacts of relays (not shown) each having a reference symbol. When M03 (spindle forward rotation instruction) is supplied from an NC in the automatic mode, relays MF, M12 and M11 are operated to energize a relay M03X. In this case, since the automatic mode is set, a relay AUT is kept ON. Unless the spindle is rotated in the reverse direction, (a relay SPCCW is kept OFF) and a relay SPCW is turned on. This indicates that the spindle forward rotation instruction is supplied to a machine such as a machine tool. In the conventional system, the high current circuit having the relays represented by the ladder diagram controls the sequence of the machine tool.

The PC creates a sequence program of FIG. 2 in accordance with the latter diagram, and the sequence program is stored in a memory so as to provide sequence control including instruction codes such as "RD", "AND", "WRT", "OR", "AND·NOT", etc. More specifically, RD is a read instruction; AND is a logical product operation instuction; WRT is a write instruction; OR is a logical sum operation instruction; and AND·NOT is an inversion/logical product instruction. Numeric values in the operand column represent addresses of a data memory (to be described later) incorporated in the PC. The addresses correspond to relay symbols (MF, M28, etc.) of FIG. 1, respectively. The relationship between the relay symbol and the address is illustrated in FIG. 1.

The relay symbols are listed for reference at the right of the table in FIG. 2. The information at the addresses of the data memory which are described in the column of operands is calculated by an instruction group D1 of the sequence program. In other words, a logical operation MF·$\overline{M28}$·$\overline{M24}$·$\overline{M22}$·M21·M18·M14·M12·M11 is calculated. A calculation result ("1" or "0") is stored at address 10.2 of the data memory which corresponds to

2 the relay M03X. The following operation is performed in accordance with an instruction group D2:
AUT·M03X·$\overline{SPCCW}$ A calculation result is stored at address 20.5 of the data memory which is designated by the operand SPCW. As a result, a spindle forward rotation signal is supplied to the machine tool as an external machine, so that the spindle of the machine tool is rotated in the forward direction. In this manner, the sequence control system having the PC is operated in accordance with the sequence program. In this control system, when an intermittent failure of the sequence occurs during automatic operation of the machine tool, it is difficult to determine the cause.

Assume that the machine tool is interrupted while in a feed hold state during NC automatic operation, and that the machine tool is not supposed to be stopped. A feed hold circuit is illustrated in FIG. 3A. Reference symbol a denotes a feed hold button; reference symbol b indicates a pressure decrease detection switch; and reference symbol SP denotes a feed hold relay. This feed hold circuit is represented by a ladder diagram in FIG. 3B. Since the machine tool is interrupted in the feed hold state, the feed hold relay SP is stopped. When a signal (i.e., logic level of the signal at address 102.5 of the data memory which represents the feed hold relay SP) representing the operating state of the feed hold relay SP is checked, a "1" is stored at address 102.5. The logic level "1" indicates that the feed hold relay SP is normally operated. This indicates that the failure may have been caused by the contact of the feed hold button or the pressure decrease detection switch being accidentally and temporarily opened during automatic operation.

However, since the contacts a and b are only instantaneously turned off, it is difficult to check changes in levels of the contacts although the contacts a and b are monitored. For this reason, detection cannot be performed as to which contact system caused the abnormality. In this sense, the failure check operation becomes cumbersome. In order to solve this problem, a system can be proposed wherein a failure check program is created and stored in the PC to discriminate failures. Even with this system, failure check operation is cumbersome.

SUMMARY OF THE INVENTION

It is an object of the present invention to provide a sequence abnormality check system in a programmable controller (PC) which checks for the cause of a failure by displaying the updating of signals associated with the failure when an abnormality occurs during normal operation of the programmable controller.

In order to achieve the above object of the present invention, there is provided a sequence abnormality check system having: an address setting means for setting a read address for reading out signals representing the states of elements of a sequence circuit which performs sequence control in the PC; and a storage means comprising an address setting table for storing an address set by the address setting means and a logic level of a signal identified by the address and a signal update storage table for storing an address signal updating order and their logic levels, wherein the logic level of the signal stored at an address of the address setting table is compared with a logic level of the actual signal; if they are different, in response to the signal from a signal update detecting means, a signal update writing means writes in the signal update storage table the address at which the signal is updated, the logic level of the actual signal at the address, and a mark representing last updating, and at the same time, updates the logic level of the signal at the address of the address setting table to the logic level of the actual signal; when addresses associated with a failure are read out from the address setting means and are stored in the address setting table, an address order obtained upon updating of the signal, and logic levels corresponding to the address order are stored in the signal update storage table; and thereafter a storage content of the signal update storage table is displayed on a display means, thereby checking for the cause of the failure in accordance with the logic levels of the signals at the respective addresses and hence checking for the failure or the like of the respective elements of the sequence circuit.

According to the sequence abnormality check system in the program controller of the present invention, when any element of the sequence circuit which is not supposed to be operated is instantaneously operated to cause a failure such as stopping of the machine tool, the logic levels of the updated signals at addresses corresponding to the elements subjected to the failure, and an updating order are displayed upon setting of these addresses. As a result, the cause of the failure can be immediately determined, thereby quickly restoring the system.

BRIEF DESCRIPTION OF DRAWINGS

FIG. 2 shows a sequence program in accordance with the ladder diagram of FIG. 1;

FIG. 3A is a circuit diagram of a feed hold circuit;

FIG. 3B is a ladder diagram of the feed hold circuit of FIG. 3A;

FIG. 7 illustrates a format of an address setting table TA; and

FIG. 8 illustrates a format of an address update storage table TB.

DETAILED DESCRIPTION OF PREFERRED EMBODIMENT

Figure 4:
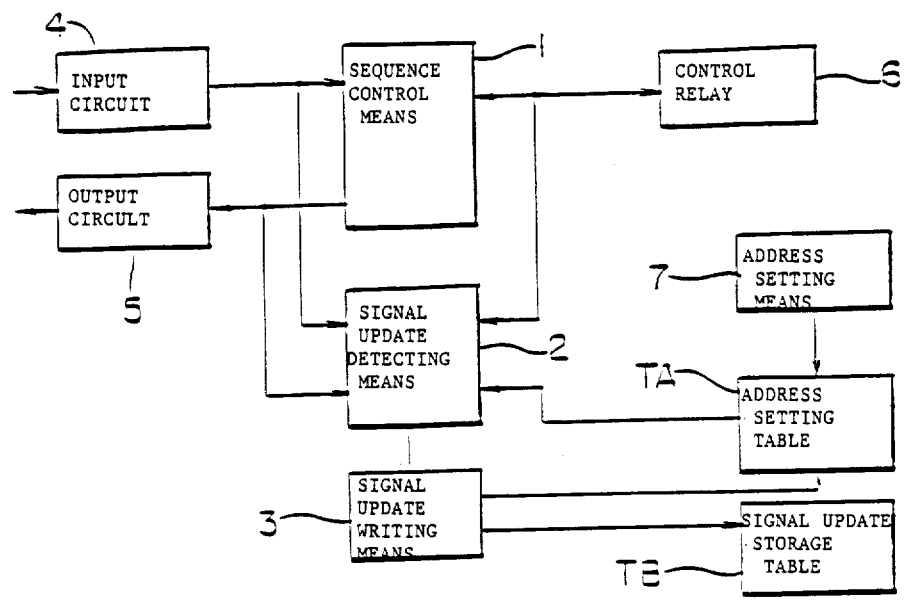
FIG. 4 is a block diagram of a sequence abnormality check system according to an embodiment of the present invention.

FIG. 4 is a block diagram of a PC which employs the present invention.

Reference numeral 1 denotes a sequence control means. The sequence control means 1 receives an input signal from a machine such as an NC machine tool through an input circuit 4 and a signal which is supplied from a control relay 6 in the sequence circuit and which is stored in the PC. The sequence control means 1 then generates an output signal to the machine through an output circuit 5 in accordance with the sequence program, thereby controlling the sequence of the machine.

The PC of the present invention has a signal update detecting means 2, a signal update writing means 3, an address setting means 7, and a storage means. The storage means has an address setting table TA and a signal update storage table TB.

The address setting means 7 sets the addresses of the data memory 13 (FIG. 5) of the PC which store the logic levels of the respective elements of the sequence circuit. When a failure occurs, an address associated with the failed element is entered by the address setting means 7 in the address setting table TA. The address setting table TA also stores the entered address and the logic level of the signal associated with this address. The signal update detecting means 2 compares the logic level of the signal at the address of the address setting table TA with a corresponding actual signal. In other words, the signal update detecting means 2 compares the logic levels of the signals at addresses of the data memory 30 which respectively correspond to the input circuit 4, the output circuit 5 and the control relay 6. When the signal update detecting means 2 detects updating of the signal, the signal update writing means 3 updates the logic level at the address of the address setting table TA to that of the actual signal. At the same time, this address, the logic level of the signal at this address, and a signal representing the last updated signal are stored in the signal update storage table TB. As a result, the signal update storage table TB stores an updated signal address order and the corresponding logic levels of the addresses.

Assume that an intermittent failure occurs to stop the machine while sequence control is performed by a PC in a machine such as the NC machine. An address associated with the failure is entered at the address setting means 7 in accordance with the ladder diagram and is stored in the address setting table TA. The signal update detecting means 2 compares the logic level of the actual signal at the address of the address setting table TA with the logic level (upon initialization, the logic level is set at "0" or "1") corresponding to this address. If these logic levels are different from each other, the updated logic level is stored at the corresponding address of the signal update storage table TB. At the same time, the logic level of the actual signal is stored in the address setting table TA. As a result, after the PC repeats the sequence control a few times, the logic levels of the current signals are stored at the respective addresses of the address setting table TA. The signal update storage table TB stores an address order representing updating of the logic levels and the updated logic levels at the addresses. At the same time, a signal representing the last updated signal is assigned at the last updated address. When the storage contents of the signal update storage table TB are displayed, the address order representing updating of the logic levels, the corresponding logic levels, and the last updated address can be visually checked. Therefore, the operator can check whether or not signal updating is normally performed, i.e., an element which is not to be operated is operated.

Figure 1:
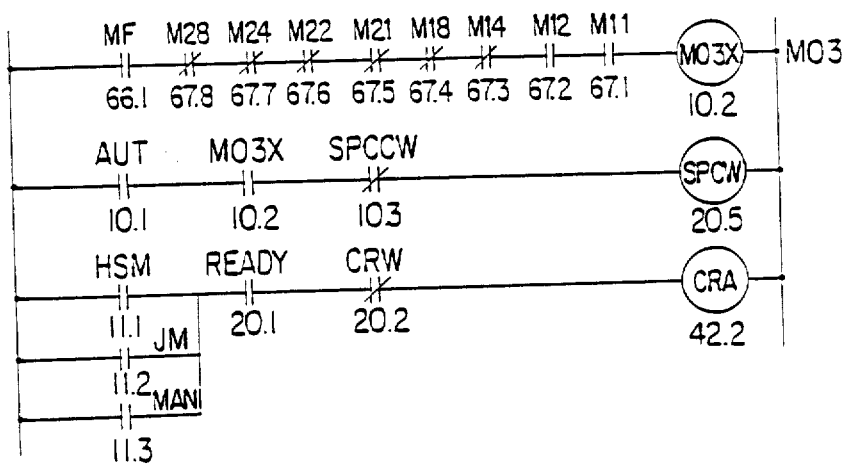
FIG. 1 is a ladder diagram.
Figure 5:
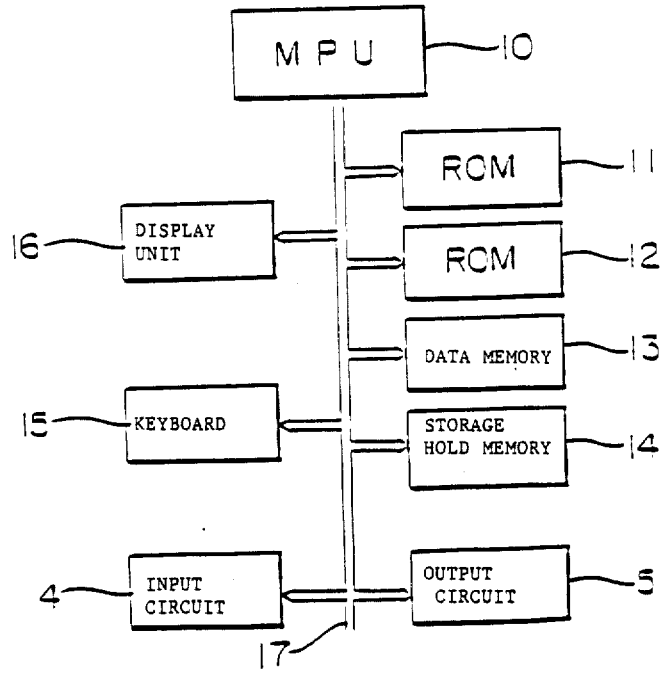
FIG. 5 is a hardware block diagram of the system of FIG. 4.
Figure 6:
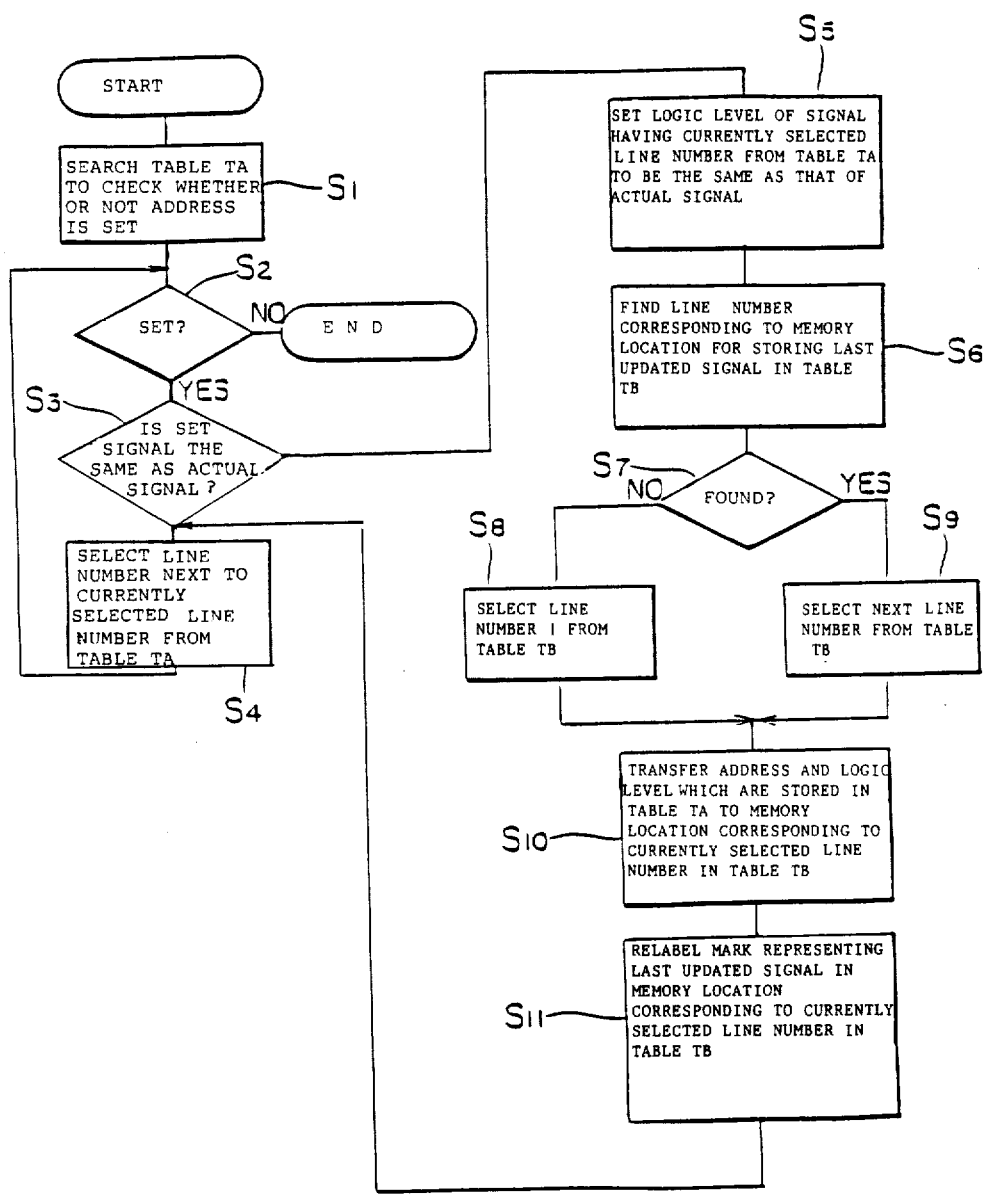
FIG. 6 is a flow chart for explaining the operation of the system of the present invention.

FIG. 5 is a block diagram of PC hardware according to the present invention. FIG. 6 is a flow chart of the operation of the PC hardware. Referring to FIG. 5, reference numeral 11 denotes a ROM for storing a control program for controlling the overall operation of the PC. Reference numeral 12 denotes a ROM for storing a sequence program and a signal update detection program. Reference numeral 13 denotes a data memory comprising a RAM for storing logic levels of signals representing the respective elements of the sequence circuit which are represented by relay symbols in FIGS. 1 and 3B. Reference numeral 10 denotes a microprocessor (MPU) for performing predetermined sequence processing in accordance with the control program and the sequence program.

The MPU 10, the ROM 11 for storing the control program, the ROM 12 for storing the sequence program and the signal update detection program, and the data memory 13 for storing logic levels of signals which represent the operating states of the respective elements of the sequence circuit constitute the sequence control means 1, the signal update detecting means 2 and the signal update writing means of FIG. 4. Reference numeral 14 denotes a storage hold memory for storing the address setting table TA and the signal update storage table TB; and reference numeral 16 identifies a display unit for displaying the tables TA and TB stored in the storage hold memory 14. The display unit 16 comprises a CRT or a printer. Reference numeral 15 denotes a keyboard input means used as the address setting means 7 of FIG. 4 for entering the address associated with a failure upon occurrence thereof into the data memory. Reference numerals 4 and 5 denote input and output circuits for connecting the NC machine or a machine tool to the PC, respectively. Reference numeral 17 denotes a bus.

The PC having the arrangement described above controls the sequence of the external machine in accordance with the sequence program stored in the ROM 12. Logic signals each having a predetermined logic level are stored at predetermined addresses of the data memory 13 by input and output signals from the input and output circuits 4 and 5. The logic levels of these signals represent the operating states of the elements of the sequence circuit. When sequence program processing (FIG. 2) is completed, signal update detection program (FIG. 6) is executed. A cycle of the sequence program and the signal update detection program is repeated.

Assume that a sensor such as a limit switch at the machine side is accidentally and temporarily operated during sequence control, causing the machine to stop. The failure check operation of the PC will be described with reference to the flow chart of FIG. 6.

When a failure occurs, the operator determines the address of a sequence element associated with the failure in accordance with the ladder diagram. This value is entered at the keyboard 15, serving as the address setting means 7, and is stored in the address setting table TA in the storage hold memory 14, as shown in FIG. 7. The logic level of the address signal may be entered at the address setting means 7. Otherwise, any logic level "1" or "0" is stored in the address setting table TA. The MPU 10 in the PC checks from the beginning of the address setting table TA whether or not the address is set in the address setting table TA (S1 of FIG. 6) after one sequence control cycle is completed. If the address is in the memory, the MPU 10 checks whether or not the signal set in the address setting table TA has the same logic level at that of the actual signal (i.e., the MPU 10 compares the logic levels of the signals which represent the operating states of the input and output circuits 4 and 5 and the control relay 6 and which are stored in the data memory 13) (S2 and S3 of FIG. 6). If the actual signal (stored in data memory 13) is the same as the corresponding logic level in table TA, the address with the next line number in the address setting table TA is compared in the same manner as described above (S4 of FIG. 6). When any signal has a logic level in the address setting table TA different from that of the actual signal, the logic level of this signal in the address setting table TA is updated to that of the corresponding actual signal (S5 of FIG. 6). The MPU 10 searches for a line number which stores the last updated signal in the signal update storage table TB in the storage hold memory 14; if not, no last updated signal is stored in the signal update storage table TB, and line number 1 is selected. When the last updated signal is present there, the next line number is selected (S6, S7, S8 and S9 of FIG. 6). The corresponding address and the corresponding logic level are stored in the selected line number memory location in the address setting table TB (S10 of FIG. 6). A signal (e.g., a mark) representing the last updated signal is stored at this memory location. The previously assigned mark in the table is deleted (S11 of FIG. 6). A line number next to the currently selected line number of the address setting table TA is selected (S4 of FIG. 6), and the same operation (S2, S3, S4, S5, . . . of FIG. 6) as described above will be performed.

The MPU 10 repeatedly performs the above processing every time one sequence control cycle is completed. As a result, the address setting table TA stores the logic levels of current signals at the set addresses. The signal update storage table TB stores an address order representing updating of the signals at the addresses of the address setting table TA, and the logic levels of the current signals. Since the memory capacity of the signal update storage table TB is limited and the signal update storage table TB is used in a circulatory manner, a mark is assigned at the address for storing the last updated signal in the signal update storage table TB. The mark identifies the beginning of the updated address order.

When the resultant contents of the signal update storage table TB are displayed on the display unit 16 or the like, the addresses at which the logic levels of the signals are updated, and an order of updating can be visually checked. Therefore, the operator can easily check for the address that should not have been updated (i.e., the element that should not have been operated), thereby simplifying failure check.

A case will be described in which the machine is stopped in the feed hold state shown in FIGS. 3A and 3B. Addresses 31.5, 24.5 and 102.5 associated with the feed hold circuit are set in the address setting table TA in accordance with the ladder diagram (FIG. 3B), as shown in FIG. 7. The feed hold button a is turned off/on once. The MPU 10 checks the address setting table TA (S1 of FIG. 6). In this case, the logic level of the signal stored at address 31.5 with line number 1 of the address setting table TA is set to "0". Since the feed hold button a is turned off once, the relay represented at address 31.5 is turned off, so that the actual signal is set at logic level "1"; the logic level of the signal stored at address 31.5 in the address setting table TA is different from that of the actual signal (S2 and S3 of FIG. 6), so that the logic level of the signal stored at address 31.5 is updated to logic level "1"; and, as shown in FIG. 8, the signal update storage table TB stores address 31.5 and logic level "1" (S5, S6, S7, S8, S10 and S11 of FIG. 6). When the relay represented by address 31.5 is turned on, the normally closed contact a' is opened, and the feed hold relay SP is turned off. The logic level of the signal stored at the actual address 102.5 becomes "0" and is different from the logic level "1" of the signal stored in the address setting table TA; the logic level of the signal in the address setting table TA is updated to "0" (S3 and S5 of FIG. 6); and, as shown in FIG. 8, address 102.5 and the corresponding logic level "0" are stored in the signal update storage table TB (S6, S7, S9, S10 and (S11) of FIG. 6).

When the feed hold button a is turned on, the relay represented by address 31.5 is turned off, and the corresponding logic level becomes "0". The logic level of the signal in the table TB is different from that in the address setting table TA. In the same manner as described above, the logic level of the signal stored at address 31.5 of the address setting table TA is set to "0". At the same time, the same address and logic level as described above are stored with line number 3 in the signal update storage table TB in FIG. 8. Since the normally closed contact of the relay represented by address 31.5 becomes ON, the feed hold relay SP is turned on. The logic level of the actual signal at address 102.5 becomes "1" and is different from that in the address setting table TA. The logic level of the signal stored at address 102.5 of the address setting table TA is updated to logic "1". This address 102.5 is stored as an updated address with line number 4 of the signal update storage table TB. At the same time, the corresponding logic level "1" is also stored in the table TB. The last updated mark is changed from line number 3 to line number 4 of the signal update storage table TB (It should be noted that the mark has not been described in the preceding part of the specification, but that the mark has been actually relabeled from line number 1 to line number 2, line number 2 to line number 3 and line number 3 to line number 4 of the signal update storage table TB). In this state, when automatic operation is started, a signal update order at addresses 31.5, 24.5 and 102.5 and the corresponding logic levels are stored in the signal update storage table TB. When the machine is interrupted in the feed hold state during automatic operation, assume that the storage contents of the signal update storage table TB are displayed on the display unit 16, as shown in FIG. 8. In the storage contents of the signal update storage table TB in FIG. 8, the logic level of the signal at address 102.5 with line number 8 of the signal update storage table TB is updated last. The previously updated address is address 24.5 in line numbers 5 and 7 of the signal update storage table TB; the relay represented by address 24.5 is turned on/off once. This indicates that the pressure decrease detection switch b represented by address 24.5 is temporarily operated. As a result, the operator can determine that the failure is caused by temporary operation of the pressure decrease detection switch.

In the above embodiment, the logic levels of the signals from the input and output circuits are stored in the data memory. However, the signals from the input and output signals need not be stored in the data memory. Addresses are assigned to the respective terminals of the input and output circuits. The logic levels of the signals may be read out from the data memory for storing the signals having logic levels representing the operating states of the terminals of the input and output circuits and the control relay in response to the address entered at the address setting means.

What is claimed is:

1. A sequence abnormality check system in a programmable controller including a sequence circuit with elements, each element having an operational state and an associated logic level representative of the actual signal for the element, comprising:

address setting means for providing an address for each element of the sequence circuit;

an address setting table for storing the addresses provided by said address setting means and for storing the operational state corresponding to the addresses;

a signal update storage table for storing the logic levels representative of the actual signals for the elements;

signal update detecting means for generating an output when an operational state of an element stored in said address setting table is different from the logic level representative of the actual signal for the element;

signal update writing means for writing into said signal update storage table an address and the logic level representative of the actual signal associated with the element having a differing operational state detected by said signal update detecting means, for writing a mark representing a last updated signal denoting the address as the last updated address, and for updating the differing operational state to correspond to the logic level representative of the actual signal; and display means, for displaying in response to said address means providing an address to said address setting table, the addresses and the logic levels stored in said signal update storage table, thereby checking a cause of the failure.

2. A system according to claim 1, further including a memory, and wherein the address provided by said address setting means comprises a memory address of the memory for storing the operational state of the element corresponding to the address.

3. A system according to claim 1, further including a memory, input and output circuits and wherein the address provided by said address setting means comprises memory addresses of of the memory for storing the operational state of the elements of said sequence circuit and signals corresponding to a state of the input and output circuits.

* * * * *